(12) United States Patent
Benz et al.

(10) Patent No.: US 6,828,009 B2
(45) Date of Patent: Dec. 7, 2004

(54) PLASTIC COMPOSITES AND PROCESS FOR THEIR MANUFACTURE

(75) Inventors: Volker Benz, Hoechst (DE); Manfred Rimpl, Otzberg-Lengfeld (DE)

(73) Assignee: Roehm GmbH & Co. KG, Darmstadt (DE)

( * ) Notice: Subject to any disclaimer, the term of this patent is extended or adjusted under 35 U.S.C. 154(b) by 90 days.

(21) Appl. No.: 09/793,419

(22) Filed: Feb. 27, 2001

(65) Prior Publication Data

US 2001/0023016 A1 Sep. 20, 2001

(30) Foreign Application Priority Data

Mar. 15, 2000 (DE) .......................................... 100 12 421

(51) Int. Cl.[7] ............................ B32B 7/02; B32B 31/02; B65C 9/25
(52) U.S. Cl. ............................ 428/213; 428/68; 428/76; 428/156; 428/203; 156/301; 156/324.4
(58) Field of Search .......................... 428/213, 68, 76, 428/156, 203; 156/301, 324.4

(56) References Cited

U.S. PATENT DOCUMENTS

| | | | |
|---|---|---|---|
| 5,338,590 A | * | 8/1994 | Rodriguez .................. 428/40 |
| 5,624,524 A | | 4/1997 | Gordon |
| 5,700,566 A | * | 12/1997 | Muller et al. ............... 428/332 |
| 5,762,741 A | | 6/1998 | Kodokian |

FOREIGN PATENT DOCUMENTS

| | | | | |
|---|---|---|---|---|
| DE | 3128985 | * | 9/1992 | ........... B32B/27/30 |
| DE | 92 10 767.2 | | 11/1992 | |
| EP | 0 581 564 A1 | | 2/1994 | |
| EP | 0 710 548 A2 | | 5/1996 | |

* cited by examiner

Primary Examiner—B. Hamilton Hess
Assistant Examiner—Lawrence Ferguson
(74) Attorney, Agent, or Firm—Oblon, Spivak, McClelland, Maier & Neustadt, P.C.

(57) ABSTRACT

Flat composites of plastic are manufactured by thermal adhesive bonding of at least two plastic parts which are heated at their surfaces and which comprise a base material coated with a plastic layer, wherein the Vicat softening point of the plastic of layer is 5 to 40° C. lower than that of the base material, wherein the base material has a thickness of 1 to 200 mm and the plastic layer has a thickness of 5 to 400 μm, and each of the parts is heated on the surfaces coated with the plastic layer and then welded under pressure.

43 Claims, No Drawings

PLASTIC COMPOSITES AND PROCESS FOR THEIR MANUFACTURE

BACKGROUND OF THE INVENTION

1. Field of the Invention

The invention relates to a process for manufacture of flat composites of plastic and to the resulting plastic composites.

2. Discussion of the Background

European Patent Application EP 584593 describes plastic composites in which at least one part of the composite comprises acrylic glass and at least one acrylic-glass joint is formed by welding. Joining by thermal welding is achieved in the presence of an intermediate layer having a thickness of 0.01 to several mm and comprising polymers formed substantially from methyl methacrylate. The shaped parts of acrylic glass can be joined in the presence of the thin intermediate layers of polymethyl methacrylate with shaped parts made of plastics, such as PVC, cellulose ethers, polystyrene, ABS plastics and polycarbonate, especially polycarbonate of bisphenol A.

If the prescribed temperature program is not exactly followed, inclusions of air or monomeric decomposition products occasionally occur during this process in the composite.

European Patent Application EP 710549 describes a process for the manufacture of flat composites from polymethyl methacrylate plastic by thermal adhesive bonding of at least two parts of polymethyl methacrylate plastic heated at their surfaces. The parts of polymethyl methacrylate plastic, which are preheated on the adhesive side to surface temperatures of 130 to 200° C. while retaining their original shape during the preheating phase, are pressed together between a pair of rolls with a feed velocity of between 5 and 200 mm/s and with a pressing force of between 10 and 500 N. At least one roll, with which the pressing force is applied, is mounted movably. European Patent Application EP 710548 describes the same process for thermoplastic compositions in general.

Although these processes have been proven in principle, problems occur occasionally when the prescribed temperature program is not exactly followed. Optical distortions, warping and adhesion problems can then occur. In particular, the handling of parts with small thickness has proved to be very difficult. The handling of parts of very different thicknesses with correspondingly different heat-absorption capacities also frequently causes problems in practice.

SUMMARY OF THE INVENTION

It was an object of the present invention to develop a process for the manufacture of flat composites of plastic by thermal adhesive bonding that results in composites that do not have the above mentioned problems and wherein the process and the properties of the resulting flat composites are less dependent on temperature fluctuations. In particular, it was an object to develop a process for the manufacture of flat composites of plastic by thermal adhesive bonding wherein the thermal joining of thin parts and parts of different thicknesses, asymmetric joining, with very different heat-absorption capacity is possible. In addition, it was an object to obtain plastic composites having unimpaired strength.

These and other objects have been achieved according to the present invention, the first embodiment of which includes a process for manufacture of flat composites of plastic, comprising:

thermal adhesive bonding of at least two plastic parts which each independently comprise a base material coated with a plastic layer;

wherein each of said plastic parts is heated on their surfaces coated with said plastic layer, thereby providing heated parts;

wherein said heated parts are welded under pressure;

wherein a Vicat softening point of said plastic layer is 5 to 40° C. lower than that of said base material; and wherein said base material has a thickness of 1 to 200 mm and said plastic layer has a thickness of 5 to 400 µm.

In another embodiment the present invention includes a plastic composite obtained according to the above process.

DETAILED DESCRIPTION OF THE INVENTION

The present invention provides for a process for the manufacture of flat composites of plastic by thermal adhesive bonding of at least two plastic parts which are heated at their surfaces and which comprise a base material (B) coated with a layer (S), wherein the Vicat softening point (VST) of the plastic of layer (S) is 5 to 40° C. lower than that of base material (B), base material (B) has a thickness of 1 to 200 mm and layer (S) has a thickness of 5 to 400 µm, and each of the parts is heated on the surfaces coated with layer (S) and then welded under pressure.

Plastic parts are used for the process according to the present invention, especially plastic plates which comprise a base material (B) coated with a layer (S).

Base material (B) has a thickness in the range of standard plate thicknesses of 1 to 100 mm, preferably 1 to 50 mm, more preferably 2 to 20 mm and most preferably 2 to 10 mm. Extruded base materials (B) are preferred.

The area of base material (B) can range, for example, from 0.01 to 10 m² with plate widths of between 0.1 and 2 m and plate lengths of between 0.1 and 5 m.

The area of base material (B) includes all values and subvalues therebetween, especially including 0.05, 0.1, 0.5, 1, 1.5, 2, 2.5, 3, 3.5, 4, 4.5, 5, 5.5, 6, 6.5, 7, 7.5, 8, 8.5, 9 and 9.5 m². The plate width includes all values and subvalues therebetween, especially including 0.5, 1 and 1.5 m. The length of the plate includes all values and subvalues therebetween, especially including 0.5, 1, 1.5, 2, 2.5, 3, 3.5, 4 and 4.5 m.

Layer (S) can be applied in the form of a lacquer or, for example, by doctoring or, in a preferred embodiment, can be applied by coextrusion with the base material in the case of thermoplastically processable plastics. Layer (S) has a thickness of 5 to 400 µm, preferably 10 to 200 µm, especially preferably 20 to 80 µm.

The thickness of layers (S) includes all values and subvalues therebetween, especially including 10, 50, 100, 150, 200, 250, 300 and 350 µm.

Base material (B) and layer (S) comprise at least one thermoelastic or thermoplastic plastic. Preferably they are thermoplastically processable, more preferably they are compatible with one another and adhere well to one another.

Examples of suitable thermoplastic plastics or plastic types are polymethyl methacrylates, polyvinyl chloride (PVC), cellulose esters, polystryrene, ABS plastics, polycarbonates, polyesters, polyethers, polyketones, polysulfones or copolymers thereof. Preferred are polymethyl methacrylate and polycarbonate plastics, especially bisphenol A polycarbonates.

Base material (B) and layer (S) preferably comprise the same plastic type. In this case base material (B) and layer (S) differ in their monomer composition, insofar as the Vicat softening point VST (according to ISO 306 Part B 50) of the plastic of layer (S) is 5 to 40, preferably 10 to 30° C. lower than that of base material (B).

Thus, base material (B) can comprise, for example, a polycarbonate with high Vicat softening point VST, and layer (S) can comprise a polycarbonate with appropriately lower VST.

Methyl methacrylate accounts for 50 to 100 wt % of the structure of polymethyl methacrylates. The most common comonomers are alkyl esters of acrylic acid with 1 to 4 carbon atoms in the alkyl group, as well as acrylonitrile and/or methacrylonitrile, styrene or maleic anhydride. Thermoplastically and thermoelastically deformable acrylic plastics are preferred. Their coefficient of viscosity according to DIN 53727 and DIN 51562 Part 1 usually ranges from 20 to 1500 ml/g. The coefficient of viscosity includes all values and subvalues therebetween, especially including 50, 100, 200, 300, 400, 500, 600, 700, 800, 900, 1000, 1100, 1200, 1300 and 1400 ml/g.

Polymethyl methacrylates with very high molecular weights such as about $10^6$ g/mol and higher exhibit thermoelastic behavior as cast acrylic glasses. They are not accessible to thermoplastic processing. Nevertheless, cast polymethyl methacrylate is suitable, for example, as base material, on which layer (S) comprising a thermoplastic polymethyl methacrylate, for example, is applied in the form of a lacquer.

Thermoplastically processable polymethyl methacrylate molding compounds for injection molding usually have molecular weights (weight-average molecular weight, Mw) of 50,000 to 150,000 g/mol, for example about 120,000 g/mol, and such compounds for extrusion have a molecular weight of above 150,000 to 250,000 g/mol, for example about 180,000 g/mol.

Base material (B) can be made, for example, from a thermoplastic polymethyl methacrylate plastic comprising 95 to 100 wt % of methyl methacrylate and up to 5 wt % of methacrylate units with a Vicat softening point VST ranging from 100 to 120° C., preferably 102 to 110° C.

Layer (S) can be made, for example, from a thermoplastic polymethyl methacrylate plastic comprising 80 to 95 wt % of methyl methacrylate and correspondingly 20 to 5 wt % of methacrylate units with a Vicat softening point VST ranging from 65 to 100° C., preferably 70 to 90° C.

Layer (S) can also be made from a polymethyl methacrylate modified to acquire impact strength and obtained by mixing an elastomer phase such as a bead or emulsion polymerization having a two-shell or three-shell structure with a polymethyl methacrylate matrix. Appropriate impact-strength-modifying agents for polymethacrylate plastics have long been known. The manufacture and structure are described, for example, in European Patent Applications EP 0113924, EP 0522351, EP 0465049 and EP 0683028. The Vicat softening points VST range from 60 to 80° C. due to mixing with the soft elastomer phase.

Layer (S) can also be made from a polyurethane plastic, preferably in combination with a base layer (B) of polycarbonate.

The thermal energy necessary for welding can be applied to the parts to be joined by several methods, such as infrared radiation. In addition, the thermal energy can be applied with hot-air blowers or even with indirect physical methods such as exposure to high-frequency or ultrasonic fields. In the process, the surfaces coated with layer (S) are preferably heated to a temperature of 5 to 30° C. above the Vicat softening point VST of the plastic of layer (S) and then directly pressed together under pressure.

For this purpose the pressure is expediently applied by rolling between a pair of rolls, in which at least one roll with which the pressing force is exerted, is mounted movably. The parts are pressed together with a feed speed of between 5 and 200 mm/s and a pressing force of between 10 and 500 N. The speed feed includes all values and subvalues therebetween, especially including 10, 20, 30, 40, 50, 60, 70, 80, 90, 100, 110, 120, 130, 140, 150, 160, 170, 180 and 190 mn/s. The pressing force includes all values and subvalues therebetween, especially including 50, 100, 150, 200, 250, 300, 350, 400 and 450 N.

The pressing force exerted with the upper roll on the polymethacrylate parts and on the composite being formed from polymethacrylate parts can, for example, be generated pneumatically or hydraulically with simple lever-type apparatuses. In general, the pressing force is constant during the entire pressing process, wherein pressing forces of between 10 and 500 N, preferably between 25 and 400 N are applied. Corresponding processes are described in European Patent Applications EP 710548 and EP 710549.

The parts to be welded to one another can be the same or different in regard to the plastics used for base material (B) and layer (S) and in regard to the thicknesses of base material (B) and layer (S). Preferably the parts to be welded to one another have the same chemical structure, in which base material (B) and layer (S) comprise at least the same plastic type or identical plastics. Plastic types within the context of the present invention are for example polymethyl methacrylates, polyvinyl chloride (PVC), cellulose esters, polystryrene, ABS plastics, polycarbonates, polyesters, polyethers, polyketones, polysulfones or copolymers thereof. Further, its is advantageous if the thicknesses of layer (S) do not differ by more than a factor of two or preferably are equally thick.

The plastic composites obtained from two parts comprise base material (B) externally and two layers (S) fused or welded to one another internally. Correspondingly, it is possible, for example, to provide a base material (B) with a layer (S) on both sides and to weld it to two parts coated on one side to obtain a plastic composite comprising three parts. By proceeding according to this principle, it is also possible to produce plastic composites comprising more than three parts. Preferred are plastic composites comprising two parts.

The composites according to the present invention can be manufactured with acrylic-glass parts in the form of plates or any other desired shape. However, the site participating in the joint is preferably a plane face.

Base material (B) and layers (S) can be transparent, colored translucent, or pigmented. Particular color effects can be incorporated in the composite. A coating of layers (S) that acts as a joint only at rim locations of the base materials (B) to be joined leads to a composite with an internal cavity, which can be, for example, rectangular and which can be used to accommodate information, such as sealed-in pictures or similar items.

The selection of layer (S) from compatible thermoplastic plastics, wherein the Vicat softening point VST of the plastic of layer (S) is 5 to 40° C. lower than that of base material (B), in combination with a smaller thickness of layer (S) of from 5 to 400 μm, offers the advantage that, for preparation of the bonding points, only a relatively small quantity of heat, which is just sufficient to soften layer (S), needs to be applied. Since the quantity of heat can be supplied independently of the thickness and condition of the base material, the risk of underheating or overheating is reduced. The tolerance range is broader. In addition, the energy consumption is correspondingly smaller.

There are obtained optically good joint sites, especially in the case of clear, transparent materials. Such clear joints are not achieved with adhesive bonds. Since layer (S) and base material (B) comprise plastics already joined firmly to one another before heating, no disadvantages result in regard to the strength of the obtained plastic composite. The strength of the resulting plastic composite is just as high as in the known processes with optimal temperature programs. The parts welded together adhere so strongly that, in attempts to destroy the joint by force, it is often not the seam but the composite material itself that breaks.

The welding of relatively thin parts, having thicknesses ranging from 1 to 6 mm, for example, and of such thin parts with thicker parts is possible with high reliability in regard to an optically flawless result.

Numerous further embodiments, known from European Patent Applications EP 710548 and EP 710549, are accessible in particularly high optical quality via the process according to the present invention. Due to the relatively high tolerances for heating of layers (S), production with relatively low failure rate is possible, especially in the case of thin parts having thicknesses ranging from 1 to 6 mm and of the combination of thin parts with thicker parts.

Composites can also be manufactured from plastic parts with flat rims, such as cupola roofs, barrel vaults or shells, by selectively heating the rims and joining them together by the process according to the present invention.

In further embodiments of the invention, it is possible to laminate flat or elongated objects between the adhesive sides of the plates or films. The prerequisite for optically flawless lamination of such objects, or in other words for avoiding air inclusions or streaking, is that the thickness of the objects be at most 50%, and preferably at most 25% of the thickness of the plates or films. Examples of flat objects that can be laminated between layers (S) of the plates or films are photographs, prints, colored films, pigment papers or films of thermoplastic elastomers, the last-mentioned of which can be used to obtain safety-glass composites. The laminated objects are permitted to occupy at most 90%, preferably at most 80% and more preferably at most 70% of the area of the adhesive sides. Examples of elongated objects that can be laminated between plates or films are narrow plastic bands, which may be colored wires, steel spirals, material ribbons, paper strips or preferably threads, most preferably plastic threads with high elasticity and high modulus, such as polyester or nylon threads, the lamination of which leads to composites with particularly good impact strength.

The plates or films can be provided with engraved or embossed patterns which have depths of at least 0.2 mm, preferably at least 1 mm, and which are disposed either on the outside or on the adhesive side of the plates or films. If the engraved or embossed patterns are disposed on the adhesive side, three-dimensional inclusions of well-defined geometry can be produced in the composite. Preferably such three-dimensional inclusions are produced by adhesively bonding at least two plates, in which each plate is provided on the adhesive side with engraved or embossed patterns, which can be joined together in mirror-image relationship. The condition for manufacture of such three-dimensional inclusions is that the engraved or embossed patterns remain dimensionally stable during heating of the surfaces of the adhesive side.

The priority document of the present application, German patent application 100 12 421.6, filed Mar. 15, 2000, is incorporated herein by reference.

Obviously, numerous modifications and variations on the present invention are possible in light of the above teachings. It is therefore to be understood that within the scope of the appended claims, the invention may be practiced otherwise than as specifically described herein.

What is claimed is:

1. A plastic composite obtained by a process comprising:
    thermal adhesive bonding of at least two plastic parts which each independently comprise a base material coated with a plastic layer;
    wherein each of said plastic parts is heated on their surfaces coated with said plastic layer, thereby providing heated parts;
    wherein said heated parts are welded under pressure;
    thereby obtaining said plastic composite which comprises said at least two plastic parts which each independently comprise a base material coated with a plastic layer;
    wherein said plastic parts are in contact at said surfaces coated with said plastic layer;
    wherein a Vicat softening point of said plastic layer is 5 to 40° C. lower than that of said base material; and
    wherein said base material has a thickness of 1 of 200 mm and said plastic layer has a thickness of 5 to 400 µm;
    wherein said base material and said plastic layer each independently comprise at least one thermoplastic plastic; and
    wherein said thermoplastic plastic is selected from the group consisting of polymethyl methacrylate, a polyvinyl chloride, a cellulose ester, a polystryrene homopolymer, a polycarbonate, a polyester, a polyether, a polyketone, a polysulfone and a copolymer thereof.

2. The plastic composite according claim 1, wherein a flat object or an elongated object is inserted between said plastic parts;
    wherein a thickness of said flat object or said elongated object is at most 50% of the thickness of said plastic parts; and
    wherein said flat object or said elongated object covers at most 90% of an adhesive area.

3. The plastic composite according claim 1, wherein a flat object or an elongated object is inserted between said plastic parts;
    wherein a thickness of said flat object or said elongated object is at most 25% of the thickness of said plastic parts; and
    wherein said flat object or said elongated object covers at most 90% of an adhesive area.

4. The plastic composite according to claim 2 or 3, wherein said flat object is at least one object selected form the group consisting of a photograph, a print, a colored film, a pigment paper and a film of a thermoplastic elastomer.

5. The plastic composite according to claim 2 or 3 wherein said elongated object is at least one object selected form the group consisting of a plastic band, a colored wire, a steel spiral, a material ribbon, a paper strip and a thread.

6. The plastic composite according to claim 5, wherein said thread is a polyester thread or a nylon thread.

7. The plastic composite according to claim 1, wherein at least one of said plastic parts is provided on its adhesive surface with an engraved pattern or an embossed pattern having a depth of at least 0.2 mm; and
    wherein said plastic parts are pressed to obtain a composite with a geometrical three-dimensional inclusion.

8. The plastic composite according to claim 1, wherein said base material has an area of 0.01 to 10 m², a width of 0.1 to 2 m and a length of 0.1 to 5 m.

9. The plastic composite according to claim 1, wherein said plastic layer has a thickness of 5 to 400 µm.

10. The plastic composite according to claim 9, wherein said plastic layer has a thickness of 10 to 200 µm.

11. The plastic composite according to claim 9, wherein said plastic layer has a thickness of 20 to 80 µm.

12. The plastic composite according to claim 1 wherein said base material comprises 95 to 100 wt. % of methyl methacrylate and up to 5 wt. % of methacrylate.

13. The plastic composite according to claim 12, wherein said base material has a Vicat softening point of 100 to 120° C.

14. The plastic composite according to claim 12, wherein said base material has a Vicat softening point of 102 to 110° C.

15. The plastic composite according to claim 1, wherein said plastic layer comprises 80 to 95 wt. % of methyl methacrylate and 20 to 5 wt. % of methacrylate.

16. The plastic composite according to claim 15, wherein said plastic layer has a Vicat softening point of 65 to 100° C.

17. The plastic composite according to claim 15, wherein said plastic layer has a Vicat softening point of 70 to 90° C.

18. The plastic composite according to claim 1, wherein a Vicat softening point of said plastic layer is 10 to 30° C. lower than a Vicat softening point of said base material.

19. The plastic composite according to claim 1, wherein a flat object or an elongated object is inserted between said plastic parts;
wherein a thickness of said flat object or said elongated object is at most 50% of the thickness of said plastic parts; and
wherein said flat object or said elongated object covers at most 90% of an adhesive area.

20. A plastic composite, comprising:
at least two plastic parts which each independently comprise a base material coated with a plastic layer;
wherein said plastic parts are in contact at their surfaces coated with said plastic layer;
wherein a Vicat softening point of said plastic layer is 5 to 40° C. lower than that of said base material; and
wherein said base material has a thickness of 1 to 200 mm and said plastic layer has a thickness of 5 to 400 µm;
wherein said base material and said plastic layer each independently comprise at least one thermoplastic plastic; and
wherein said thermoplastic plastic is selected from the group consisting of polymethyl methacrylate, a polyvinyl chloride, a cellulose ester, a polystryrene homopolymer, a polycarbonate, a polyester, a polyether, a polyketone, a polysulfone and a copolymer thereof.

21. The plastic composite according to claim 20, wherein a flat object or an elongated object is inserted between said plastic parts;
wherein a thickness of said flat object or said elongated object is at most 25% of the thickness of said plastic parts; and
wherein said flat object or said elongated object covers at most 90% of an adhesive area.

22. The plastic composite according to claim 19 or 21, wherein said flat object is at least one object selected form the group consisting of a photograph, a print, a colored film, a pigment paper and a film of a thermoplastic elastomer.

23. The plastic composite according to claim 19 or 21, wherein said elongated object is at least one object selected form the group consisting of a plastic band, a colored wire, a steel spiral, a material ribbon, a paper strip and a thread.

24. The plastic composite according to claim 23, wherein said thread is a polyester thread or a nylon thread.

25. The plastic composite according to claim 20, at least one of said plastic parts is provided on its adhesive surface with an engraved pattern or an embossed pattern having a depth of at least 0.2 mm; and
wherein said plastic parts are pressed to obtain a composite with a geometrical three-dimensional inclusion.

26. The plastic composite according to claim 20, wherein said base material has an area of 0.01 to 10 m², a width of 0.1 to 2 m and a length of 0.1 to 5 m.

27. The plastic composite according to claim 20, wherein said plastic layer has a thickness of 5 to 400 µm.

28. The plastic composite according to claim 27, wherein said plastic layer has a thickness of 10 to 200 µm.

29. The plastic composite according to claim 27, wherein said plastic layer has a thickness of 20 to 80 µm.

30. The plastic composite according to claim 20, wherein said base material comprises 95 to 100 wt. % of methyl methacrylate and up to 5 wt. % of methacrylate.

31. The plastic composite according to claim 30, wherein said base material has a Vicat softening point of 100 to 120° C.

32. The plastic composite according to claim 30, wherein said base material has a Vicat softening point of 102 to 110° C.

33. The plastic composite according to claim 20, wherein said plastic layer comprises 80 to 95 wt. % of methyl methacrylate and 20 to 5 wt. % of methacrylate.

34. The plastic composite according to claim 33, wherein said plastic layer has a Vicat softening point of 65 to 100° C.

35. The plastic composite according to claim 33, wherein said plastic layer has a Vicat softening point of 70 to 90° C.

36. The plastic composite according to claim 20, wherein a Vicat softening point of said plastic layer is 10 to 30° C. lower than a Vicat softening point of said base material.

37. A process for manufacture of flat composites of plastic, comprising:
thermal adhesive bonding of at least two plastic parts which each independently comprise a base material coated with a plastic layer;
wherein each of said plastic parts is heated on their surfaces coated with said plastic layer, thereby providing heated parts;
wherein said heated parts are welded under pressure;
wherein a Vicat softening point of said plastic layer is 5 to 40° C. lower than that of said base material; and
wherein said base material has a thickness of 1 to 200 mm and said plastic layer has a thickness of 5 to 400 µm.

38. The process according to claim 37, wherein said surfaces coated with said plastic layer are heated to a temperature of 5 to 30° C. above the Vicat softening point of said plastic layer.

39. The process according to claim 37, wherein said heated parts are joined by rolling.

40. The process according to claim 39, wherein said rolling is performed between a pair of rolls, in which at least one roll, with which the pressing force is exerted, is mounted movably;
wherein said rolling occurs at a feed speed of between 5 and 200 mm/s and with a pressing force of between 10 and 500 N.

41. The process according to claim 37, wherein said plastic layer and said base material of said plastic parts are manufactured by coextrusion; and
wherein said plastic parts are joined to one another.

42. The process according to claim 37, wherein said base material and said plastic layer comprise independently a polymethyl methacrylate plastic or a polycarbonate plastic.

43. The process according to claim 37, wherein said plastic layer is applied to the base material in the form of a lacquer or by coextrusion with the base material.

* * * * *

UNITED STATES PATENT AND TRADEMARK OFFICE
CERTIFICATE OF CORRECTION

PATENT NO. : 6,828,009 B2
DATED : December 7, 2004
INVENTOR(S) : Volker Benz et al.

It is certified that error appears in the above-identified patent and that said Letters Patent is hereby corrected as shown below:

Column 3,
Lines 34 and 39, "methacrylate units" should read -- methyl acrylate units --.

Column 6,
Line 36, "selected form" should read -- selected from --;
Line 61, "% of methacrylate." should read -- % of methyl acrylate. --.

Column 7,
Line 3, "% of methacrylate." should read -- % of methyl acrylate. --;
Line 48, "selected form" should read -- selected from --.

Column 8,
Lines 9 and 18, "% of methacrylate." should read -- % of methyl acrylate. --.

Signed and Sealed this

Twenty-sixth Day of April, 2005

JON W. DUDAS
*Director of the United States Patent and Trademark Office*